UNITED STATES PATENT OFFICE.

FRANCIS LAUR, OF PARIS, FRANCE, ASSIGNOR TO HARRISON BROTHERS & CO., OF PHILADELPHIA, PENNSYLVANIA.

MANUFACTURE OF ALUMINOUS CAKE.

SPECIFICATION forming part of Reissued Letters Patent No. 9,340, dated August 10, 1880.

Original No. 208,615, dated October 1, 1878; Reissue No. 8,882, dated September 2, 1879. Patented in France December 1, 1876, in Great Britain September 5, 1877, in Italy September 15, 1877, and in Germany June 1, 1878. Application for reissue filed July 1, 1880.

*To all whom it may concern:*

Be it known that I, FRANCIS LAUR, engineer, of Paris, in the Republic of France, have invented Improvements in the Manufacture of Aluminous Cake, of which the following is a specification.

The object of this invention is to manufacture from aluminous earths containing more or less iron, such as argil, kaolin, &c., and by preference with hydrates of alumina, known under the name of "bauxites," and containing fifty to eighty per cent. of alumina, a sulphate of alumina completely deprived of free acid, and exempt or almost exempt from iron, in such form or combination ($Fe_2O_3$) as would discolor the resulting sulphate of alumina, and thus to produce from the above ferruginous clays a white sulphate of alumina such as has not been manufactured up to the present time.

I proceed in the following manner: Into a vessel of lead, or lined with lead, I pour a certain quantity of sulphuric acid at 50° Baumé—two hundred kilograms, for instance. I heat it by means of a jet of live steam. When the sulphuric acid begins to boil I pour into the acid one hundred and ten to one hundred and thirty kilograms of bauxite (hydrate of alumina) in a powdered form. At the end of some minutes a very lively reaction takes place. The mixture, which, before the reaction ought to occupy only one-fifth at most of the capacity of the vessel, will even flow over if care is not taken to add at this moment sixty to sixty-five liters of water. The mixture is thus kept in the vessel, and if it threatens again to flow over I add some liters of water to prevent it. At the end of about an hour the mixture has returned to its original volume. I then add water at pleasure, according to the degree of concentration which it is desired to obtain, and I thus have a solution of sulphate of alumina containing about one-half per cent. of iron in combination in the form of $Fe_2O_3$.

The sulphate-of-alumina solution containing iron in this form is to a great degree discolored by its presence, the result being that for many purposes, such as paper-making, sulphate of alumina containing $Fe_2O_3$ is greatly reduced in value. The unattacked silicate of the bauxite and the unattacked bauxite slowly precipitate and are very easily separated by decantation.

To convert the ferric oxide ($Fe_2O_3$) present in the solution of sulphate of alumina into ferrous oxide (FeO) and thus produce an aluminous cake free from color, I merely introduce old pieces of zinc into the ferruginous solution of sulphate—three to five kilograms in the example given. The zinc is attacked, and at the end of four to five hours when under the influence of heat, and one to two days at ordinary temperature, the iron is converted from $Fe_2O_3$ to FeO, the latter article forming a colorless compound of iron, and at the same time any silica or other impurities not already precipitated are deposited in the bottom of the vessel. It now only remains to siphon or decant the limpid solution, which is absolutely deprived of free acid, and does not readily become blue by testing with yellow prussiate of potash in the usual manner.

In the example chosen—that is to say, two hundred kilograms of acid at 50°—there is obtained three hundred kilograms of sulphate of alumina in solution, which it is only necessary to concentrate under heat up to 46° Baumé and pour it off into a cake by the ordinary method.

It is indispensable to employ a bauxite very finely ground, or to increase the proportion of it, to obtain at the first trial a neutral solution or almost neutral (basic) solution.

The product obtained by the process above described consists, essentially, of sulphate of alumina, sulphate of zinc, and sulphate of protoxide of iron in varying quantities, depending on the composition of the bauxite or other aluminous earth employed, and is, first, completely exempt from free acid; second, not hygroscopic and not absorbent of moisture; third, capable of being ground as finely as may be desired; fourth, possessing a quantity of alumina which may reach twenty per cent., and which is never lower than eighteen per cent.; and, fifth, white. These qualities are not met with in the sulphates of alumina made from ferruginous clays and hitherto met in commerce, and they may serve to characterize the new product resulting from the process I have described.

I claim—

1. As an improvement in the process of manufacturing aluminous cake—viz., first making a neutral solution of the same, and then introducing pieces of zinc to convert the iron into a colorless compound of iron in the said solution prior to concentration, substantially as described.

2. An aluminous compound for paper-makers' use, as described, in cake or ground form, containing sulphate of zinc.

In testimony whereof I have hereunto signed my name this 1st day of January, A. D. 1880.

F. LAUR.

In presence of—
MORITZ HARTWIG,
A. HUTTE.